US010377440B2

(12) United States Patent
Eguchi

(10) Patent No.: US 10,377,440 B2
(45) Date of Patent: Aug. 13, 2019

(54) BICYCLE AND STEM ASSEMBLY

(71) Applicant: YAMAHA HATSUDOKI KABUSHIKI KAISHA, Iwata-shi, Shizuoka (JP)

(72) Inventor: Munemitsu Eguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/124,270

(22) Filed: Sep. 7, 2018

(65) Prior Publication Data

US 2019/0084640 A1 Mar. 21, 2019

(30) Foreign Application Priority Data

Sep. 15, 2017 (JP) .................................. 2017-178256

(51) Int. Cl.
| | | |
|---|---|---|
| *B62K 21/12* | (2006.01) | |
| *B62J 11/00* | (2006.01) | |
| *B62J 6/18* | (2006.01) | |
| *B62J 6/02* | (2006.01) | |

(52) U.S. Cl.
CPC ................. *B62K 21/12* (2013.01); *B62J 6/02* (2013.01); *B62J 6/18* (2013.01); *B62J 11/00* (2013.01)

(58) Field of Classification Search
CPC ..... B62K 21/12; B62J 6/02; B62J 6/18; B62J 11/00
See application file for complete search history.

(56) References Cited

U.S. PATENT DOCUMENTS

| | | | | |
|---|---|---|---|---|
| 6,305,241 | B1 * | 10/2001 | Masui | B62J 11/00 224/420 |
| 6,584,872 | B1 * | 7/2003 | Kojima | B62J 99/00 74/551.3 |
| 7,354,320 | B2 * | 4/2008 | Onogi | B62J 6/18 280/288.4 |
| 8,998,048 | B1 * | 4/2015 | Wu | B62J 11/00 224/420 |
| 9,327,787 | B1 | 5/2016 | Chen | |
| 2001/0039850 | A1 | 11/2001 | Masui et al. | |
| 2003/0230228 | A1 | 12/2003 | Kinoshita | |
| 2005/0029772 | A1 | 2/2005 | Oi | |
| 2005/0180150 | A1 | 8/2005 | Okada et al. | |
| 2005/0229735 | A1 | 10/2005 | Fujii | |
| 2006/0053954 | A1 | 3/2006 | Tiong | |
| 2010/0059638 | A1 * | 3/2010 | Taiga | B62J 11/00 248/124.1 |
| 2010/0127030 | A1 | 5/2010 | Mühlberger | |

(Continued)

FOREIGN PATENT DOCUMENTS

| | | |
|---|---|---|
| CN | 2530874 Y | 1/2003 |
| CN | 101934841 A | 1/2011 |

(Continued)

*Primary Examiner* — Vicky A Johnson
(74) *Attorney, Agent, or Firm* — Keating and Bennett, LLP

(57) ABSTRACT

A bicycle includes a handlebar, a handle stem on which the handlebar is disposed, a clamp that is attached to the handle stem to fix the handlebar on the handle stem, and a support extending forward and including a first attachment. The first attachment is located farther forward than the handlebar. A display is attached to the first attachment so that the display is placed at an appropriate height to improve visibility of the display.

16 Claims, 10 Drawing Sheets

(56) References Cited

U.S. PATENT DOCUMENTS

| | | | |
|---|---|---|---|
| 2010/0246199 A1* | 9/2010 | Ma | B62J 6/02 |
| | | | 362/474 |
| 2011/0162929 A1 | 7/2011 | Moore | |
| 2013/0098959 A1* | 4/2013 | Onogi | B62J 11/00 |
| | | | 224/419 |
| 2013/0151073 A1* | 6/2013 | Tetsuka | B62M 25/04 |
| | | | 701/37 |
| 2014/0157944 A1* | 6/2014 | Galstad | B62K 19/40 |
| | | | 74/551.8 |
| 2016/0059920 A1 | 3/2016 | Takanashi et al. | |
| 2016/0272263 A1* | 9/2016 | Zeindl | B62J 11/00 |
| 2018/0178874 A1 | 6/2018 | Li | |

FOREIGN PATENT DOCUMENTS

| | | |
|---|---|---|
| CN | 204383704 U | 6/2015 |
| CN | 204548374 U | 8/2015 |
| CN | 204726598 U | 10/2015 |
| CN | 204937376 U | 1/2016 |
| CN | 105644664 A | 6/2016 |
| DE | 20 2016 005 281 U1 | 12/2016 |
| JP | 2001-026290 A | 1/2001 |
| JP | 2004-009973 A | 1/2004 |
| JP | 2005-053363 A | 3/2005 |
| JP | 2005-225426 A | 8/2005 |
| JP | 2005-306368 A | 11/2005 |
| JP | 2006-044653 A | 2/2006 |
| JP | 2013-180702 A | 9/2013 |
| WO | 2010/128761 A2 | 11/2010 |
| WO | 2010/149344 A1 | 12/2010 |

* cited by examiner

BICYCLE AND STEM ASSEMBLY

CROSS REFERENCE TO RELATED APPLICATIONS

This application claims the benefit of priority to Japanese Patent Application No. 2017-178256 filed on Sep. 15, 2017. The entire contents of this application are hereby incorporated herein by reference.

BACKGROUND OF THE INVENTION

1. Field of the Invention

The present invention relates to a handle stem mounted on a bicycle.

2. Description of the Related Art

Some bicycles have a display device mounted thereon for displaying, for example, velocity and travel distance thereof. Electric assist bicycles also include such a display device mounted thereon. Display devices in some electric assist bicycles indicate, for example, a control mode of assist and remaining battery power in addition to the velocity, etc. The display device is generally attached to the handlebar of the bicycle. In some cases, various devices such as a headlight and a navigation device as well as the display device need to be attached to the handlebar. However, it can be difficult to secure enough space for those various devices on the handlebar. Chinese Utility Model No. 204548374 discloses that a display device is attached to a stem supporting a handlebar, not directly attached to the handlebar. The structure disclosed in Chinese Utility Model No. 204548374 enables more devices to be arranged around the handlebar.

However, in Chinese Utility Model No. 204548374, the stem is disposed on the upper side of the handlebar and the display is attached to the upper side of the stem. Therefore, the display is positioned high, which may make the distance between the display and the eyes of a rider smaller than a distance comfortable for the rider.

SUMMARY OF THE INVENTION

Preferred embodiments of the present invention provide bicycles and stem assemblies for bicycles that enable a display to be placed at an appropriate height and improve visibility of the display.

According to a preferred embodiment of the present invention, a bicycle includes a handlebar; a handle stem on which the handlebar is disposed; a clamp that is attached to the handle stem to fix the handlebar on the handle stem; a support extending forward from the handle stem and including a first attachment, the first attachment being located farther forward than the handlebar; and a display attached to the first attachment. The bicycle described above enables the display to be placed at an appropriate height and improves visibility of the display.

According to a preferred embodiment of the present invention, the support may include a portion to mount a component or a device that is different from the display. This simplifies the layout of the components and the devices arranged around the handlebar. In a preferred embodiment of the present invention, a component or a device different from the display include, for example, an input including buttons or a lever that a rider operates, a headlight, a reflector that reflects light, a cable, and a mobile terminal (cell phone, for example) owned by a rider.

According to a preferred embodiment of the present invention, the component or the device different from the display may be a headlight, and the support may include, as the portion to mount the component or the device, a second attachment having the headlight attached thereto.

According to a preferred embodiment of the present invention, the component or the device different from the display may be an input that a rider operates, and the support may include, as the portion to mount the component or the device, a second attachment having the input attached thereto.

According to a preferred embodiment of the present invention, the support may include a guide that defines a cable path through which a cable passes. This simplifies the layout of the cable around the handlebar.

According to a preferred embodiment of the present invention, the support may be separate from the handle stem and is attached to the handle stem, and the guide may define the cable path together with the handle stem. It is easier to provide a wall that defines the cable path (a wall surrounding the cable) by using the two members (that is, the handle stem and the support) described above than by using only a single member.

According to a preferred embodiment of the present invention, the cable path may be located under the handle stem. This enables the handle stem to cover the cable and to prevent the cable from being prominently exposed.

According to a preferred embodiment of the present invention, the support may include at least one second attachment to which the component or the device different from the display is attached. Further, the at least one second attachment may extend in a right-left direction. This structure enables a device that has been configured to be attached to the handlebar to be attached to the supplementary attachment, not to the handlebar. As a result, the number of components and devices arranged around the handlebar increases.

According to a preferred embodiment of the present invention, the support may include, as the at least one second attachment, a right second attachment located rightward of the handle stem in a plan view and a left second attachment located leftward of the handle stem in the plan view.

According to a preferred embodiment of the present invention, the at least one second attachment may be located farther rearward than a center line of the handlebar. This enables the rider to operate the input attached to the second attachment with, for example, his/her thumb.

According to a preferred embodiment of the present invention, the at least one second attachment may be located lower than the center line of the handlebar in a side view. This enables the rider to operate the input attached to the second attachment with his/her thumb.

According to a preferred embodiment of the present invention, the support may be separate from the handle stem and is attached to the handle stem. This increases the design freedom in the shape of the support.

According to a preferred embodiment of the present invention, the support may include a connector disposed under the handle stem and attached to the handle stem. This prevents the support from being prominently exposed.

According to a preferred embodiment of the present invention, the handle stem may include a front surface including an inclined surface, the inclined surface extending obliquely in a rearward and upward direction and including a receiver on which the handlebar is disposed. The display may be located in front of the receiver. This reduces the clearance between the handlebar and the display in the front-rear direction.

According to a preferred embodiment of the present invention, the display may include a connector in a rear surface thereof.

According to a preferred embodiment of the present invention, a stem assembly includes a handle stem on which a handlebar is disposed, a clamp that fixes the handlebar to the handle stem, and a support extending forward from the handle stem, wherein the support includes an attachment for a display to be attached thereto, the attachment being located farther forward than the handlebar. The stem assembly described above enables the display to be placed at an appropriate height and improves visibility of the display.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
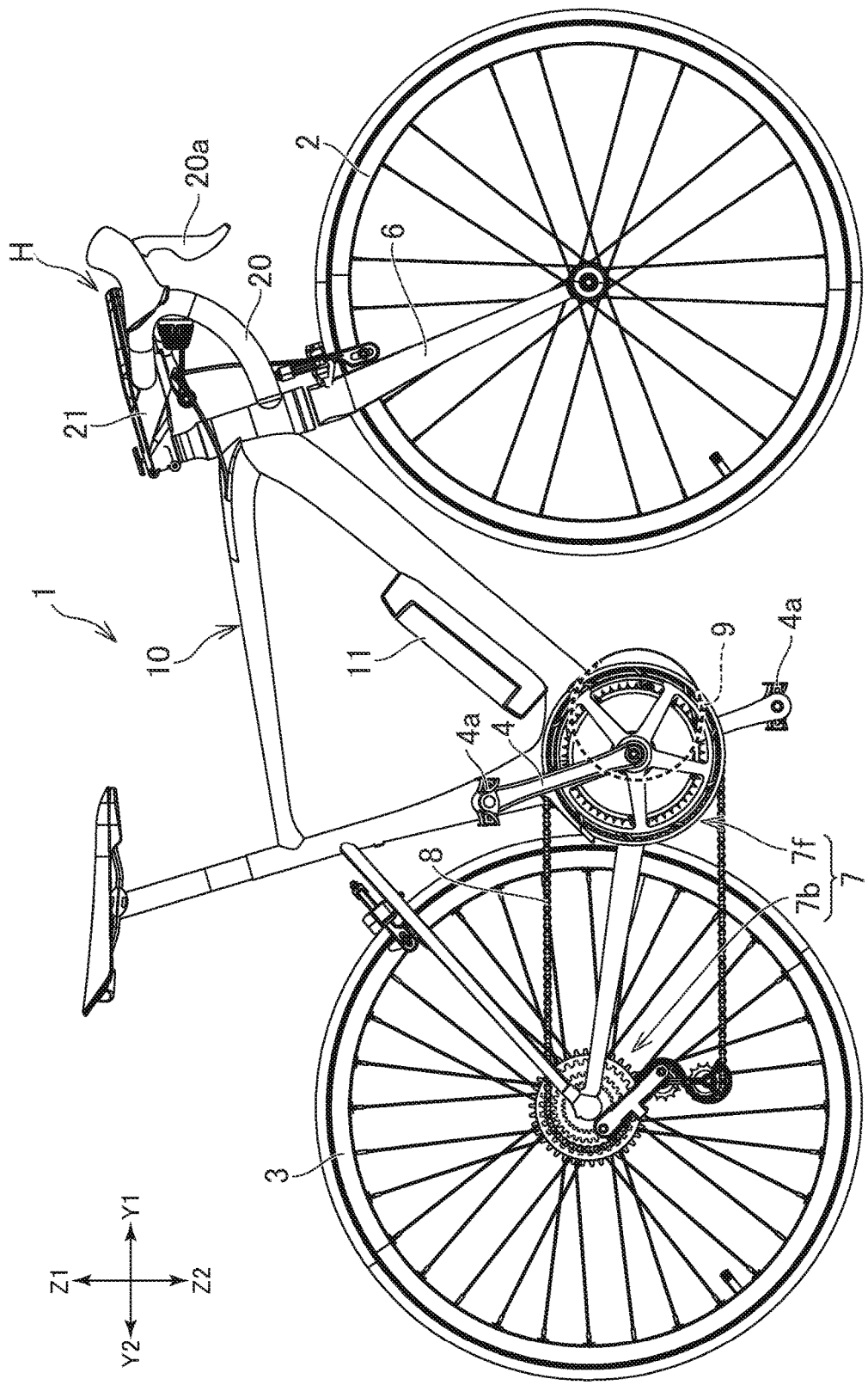
FIG. 1 is a side view that illustrates an example of a bicycle according to a preferred embodiment of the present invention.
Figure 2:
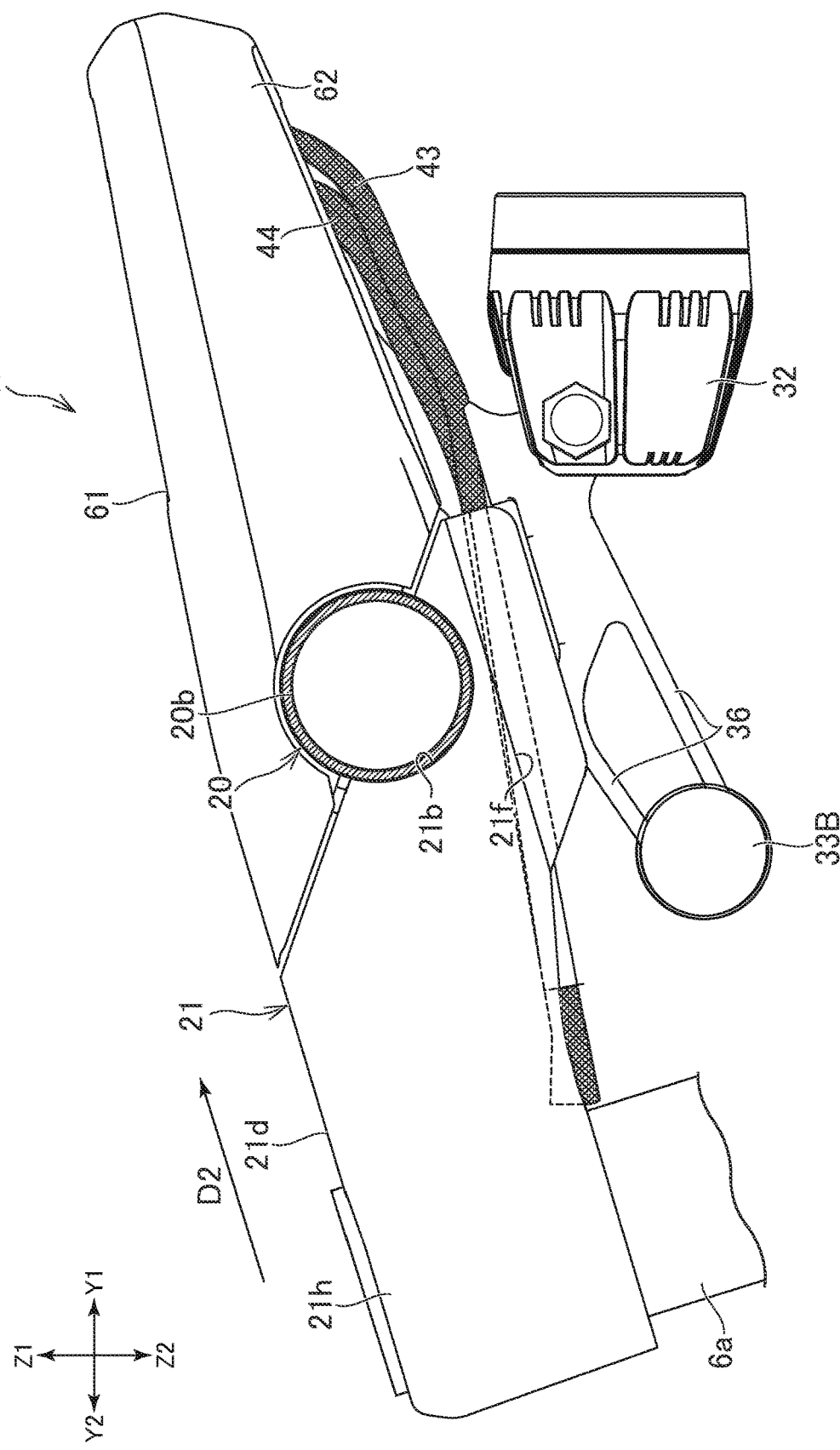
FIG. 2 is a side view that illustrates a stem assembly that includes a handle stem to be mounted on the bicycle shown in FIG. 1 and a component attached to the handle stem. In this drawing, the display is covered by a cover.

The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which the present invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the preferred embodiments of the present invention, it will be understood that a number of technologies are disclosed. Each of these has individual benefits and each may also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the present invention and the claims.

In the following description, for purposes of explanation, numerous specific details are set forth in order to provide a thorough understanding of preferred embodiments of the present invention. It will be evident, however, to one skilled in the art that the preferred embodiments of the present invention may be practiced without these specific details.

The present disclosure is to be considered as an exemplification of the present invention, and is not intended to limit the present invention to the specific preferred embodiments illustrated by the figures or description below.

Examples of a bicycle and a stem assembly proposed in the present disclosure will be explained. In the present specification will be described an electric assist bicycle 1 where an electric motor assists pedaling motion of a rider, for example. Technologies proposed in the present disclosure may be applied to a bicycle without the electric motor. Further, the technologies have no limitation to the kind of bicycles (for example, on-road type and off-road type).

Further, in FIGS. 1 to 9, the directions indicated by Y1 and Y2 are referred to as a forward direction and a rearward direction, respectively, and the directions indicated by Z1 and Z2 are referred to as an upward direction and a downward direction, respectively. The directions indicated by X1 and X2 are referred to as a rightward direction and a leftward direction, respectively.

As shown in FIG. 1, the bicycle 1 includes a front wheel 2 and a rear wheel 3. The bicycle 1 includes a crank 4, pedals 4a attached to both ends of the crank 4, and a transmission 7. The transmission 7 includes a front transmission 7f including a plurality of gears coaxially aligned with the crank 4, and a rear transmission 7b including a plurality of gears coaxially aligned with the axis of the rear wheel 3. The front transmission 7f and the rear transmission 7b are interlocked via a chain 8. In addition, the bicycle 1 includes an electric motor 9 that assists the pedaling movement of a rider. A pedaling force applied to the pedal 4a by a rider and an assisting force of the electric motor 9 are unified and transmitted to the rear wheel 3. A battery 11 that stores electric power to be supplied to the electric motor 9 is attached to the body frame 10 of the bicycle 1.

The structure of the bicycle 1 is not limited to the example described above. For example, the bicycle 1 may not include the electric motor 9 and the battery 11. The bicycle 1 may not include one of the two derailleurs 7f, 7r, and may not include both of two derailleurs 7f and 7r. The bicycle 1 may include a belt or shaft instead of the chain 8.

The front wheel 2 is connected to the handlebar 20 via a front fork 6, a steering column 6a (see FIG. 2) connected to the top of the front fork 6, and a handle stem 21. On the handlebar 20 are attached a brake lever 20a, a shift lever (not shown) that operates the transmission 7, and the like.

Figure 3:
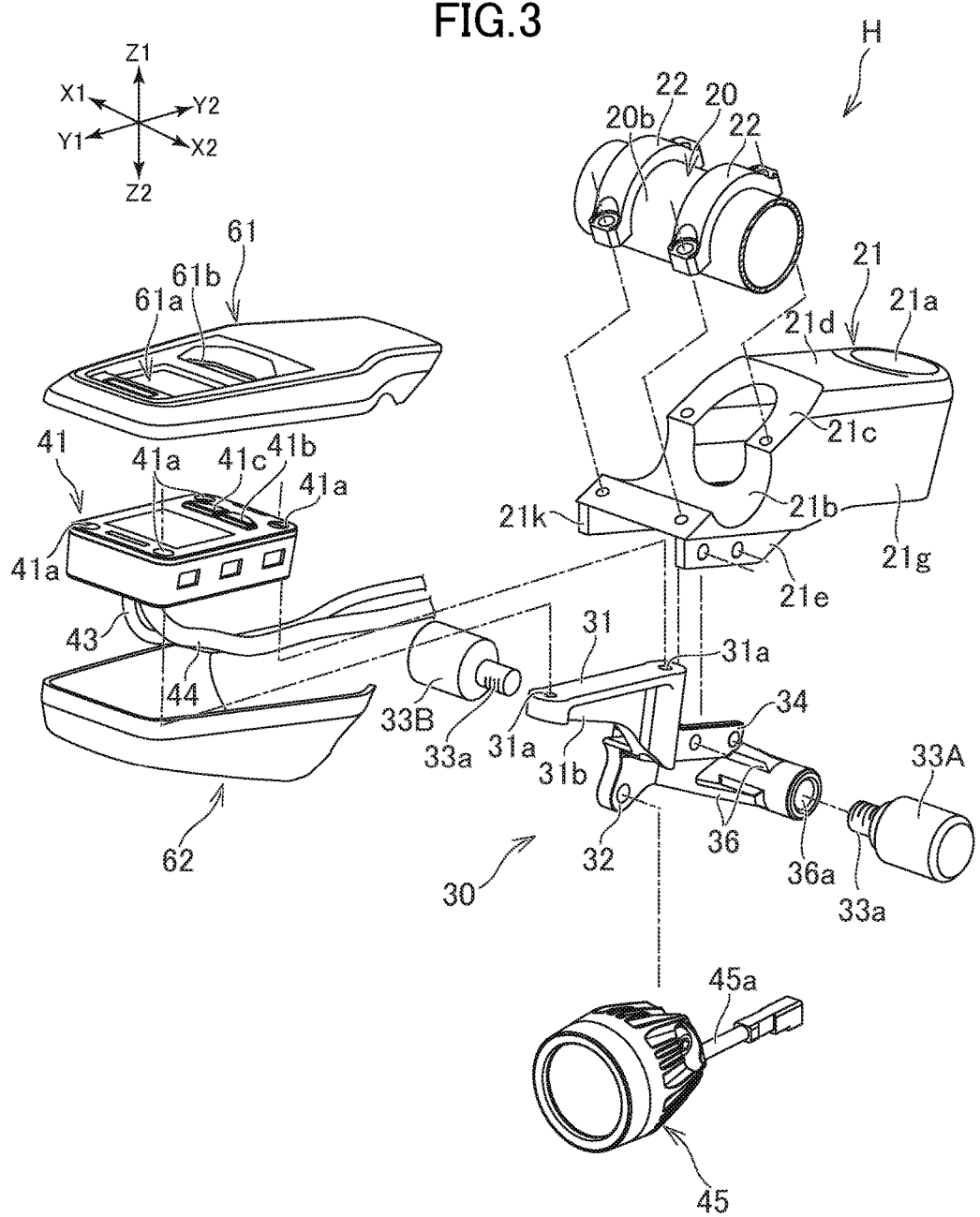
FIG. 3 is an exploded perspective view of the stem assembly.

The handle stem 21 extends forward from the upper end of the steering column 6a. More specifically, the handle stem 21 extends obliquely in a forward and upward direction. As shown in FIG. 3, the base portion of the handle stem 21 includes a hole 21a therein into which the steering column 6a is inserted. The handle stem 21 is preferably integrally made of metal.

As shown in FIG. 3, the handle stem 21 includes a receiver 21b therein in which the handlebar 20 is inserted. The receiver 21b is concave and includes an inner surface that is, for example, semi-cylindrically curved in accordance with the curved circumference surface of the handlebar 20. The receiver 21b is provided on the front surface 21c of the handle stem 21. In the present preferred embodiment, the front surface 21c is inclined with respect to the extending direction of the handle stem 21 (the direction indicated by D2 in FIG. 4). More specifically, the front surface 21c is inclined and extends obliquely in a rearward and upward direction. As will be explained in detail below, this inclination of the front surface 21c allows the length of the stem assembly H including the handle stem 21 and the display 41 to be reduced in the front-rear direction.

As shown in FIG. 3, the stem assembly H includes a clamp 22 that fixes the handlebar 20 to the handle stem 21. The clamp 22 is separate from the handle stem 21 and is attached to the handle stem 21 by a fastener such as a screw or a bolt. The clamp 22 is attached to the front surface 21c with the handlebar 20 sandwiched between the clamp 22 and the receiver 21b. In a preferred embodiment of the bicycle 1, the clamp 22 is preferably curved in an arc in accordance with the circumferential surface of the handlebar 20 in a side view (see FIG. 4). The handlebar 20 is fixed to the handle stem 21 by two clamps 22 aligned in the left-right direction (see FIG. 3). The two clamps 22 may be connected to each other to define a single element.

The attachment of the handlebar 20 to the handle stem 21 is not limited to the preferred embodiment described above. For example, the front surface 21c of the handle stem 21 may not be inclined. In other words, the receiver 21b in which the handlebar 20 is inserted may be provided on the upper surface 21d (the surface parallel or substantially parallel to the extending direction of the handle stem 21) of the handle stem 21 or may be provided on a front surface which is perpendicular or substantially perpendicular to the extending direction of the handle stem 21.

Figure 4:
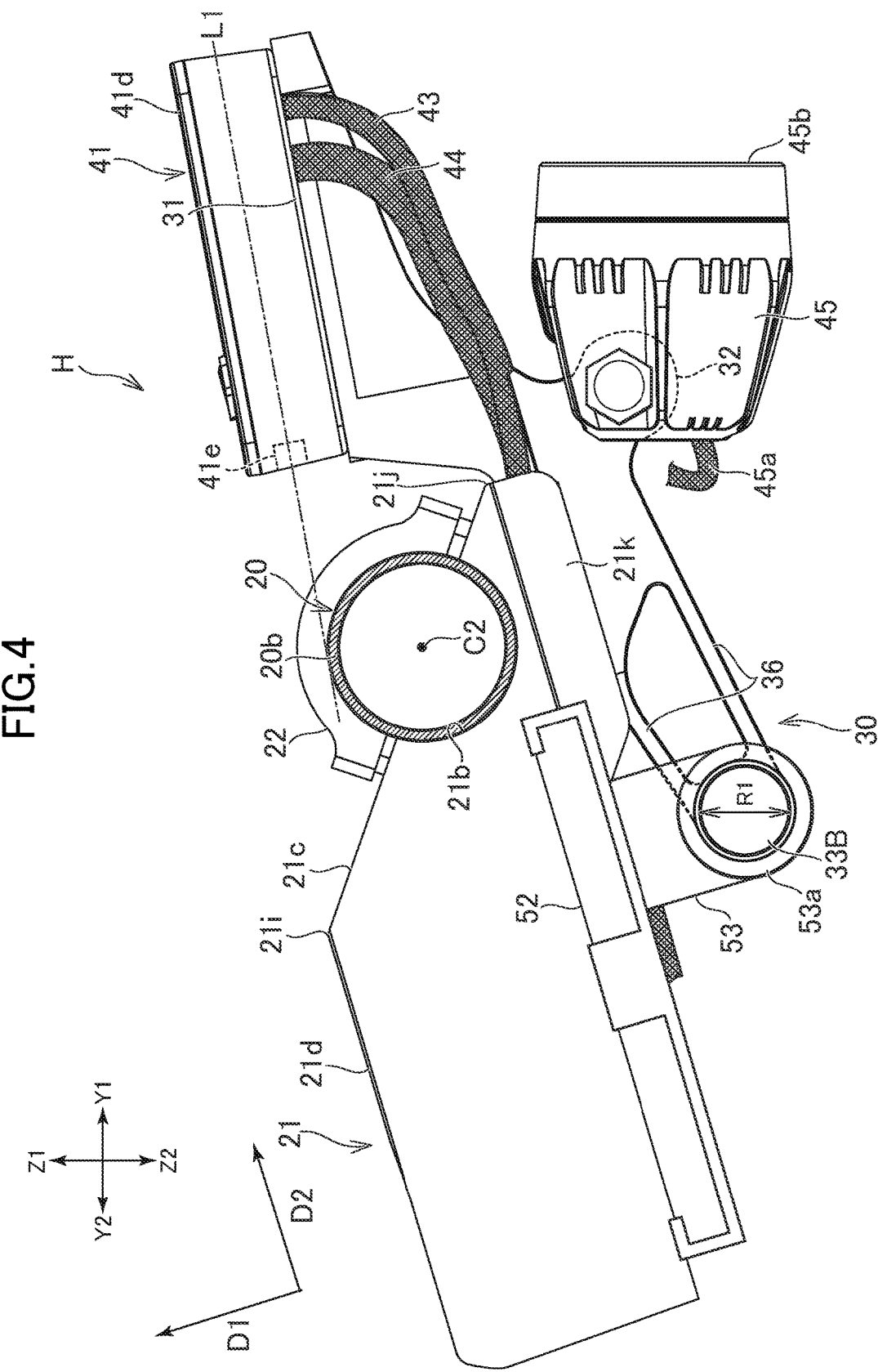
FIG. 4 is a side view of a stem assembly. This drawing shows a mobile terminal mounted on the stem assembly.

As shown in FIG. 4, the stem assembly H includes a support 30 extending forward from the handle stem 21. The support 30 includes an attachment therein to which a component or device of the bicycle 1 is attached. Specifically, the bicycle 1 includes a display 41 as an example of the component or the device. The support 30 includes an attachment 31 to which the display 41 is attached (hereinafter, the attachment 31 is referred to as "display attachment"). The display attachment 31 is located along the lower surface of the display 41. The bicycle 1 includes covers 61, 62 that cover the upper surface of the display 41 (see FIG. 2).

The support 30 further includes a portion to mount a component or a device different from the display onto the bicycle 1. More specifically, the support 30 includes a plurality of attachments 32, 33A, 33B (see FIG. 3) and a cable guide 35 (see FIG. 7) that defines a path through which a cable 43, 44 extends. To the attachments 32, 33A, 33B are attached, for example, a headlight 45 (see FIG. 4), an input 51 (see FIG. 6), devices owned by a rider (for example, a mobile terminal 52 (see FIG. 6)). The mobile terminal 52 may be, for example, a smartphone, a GPS receiver, or the like. The support 30 enables positions of the components and the devices arranged around the handlebar 20 to be located around the support 30, which simplifies the layout of the components and the devices. The attachments 32, 33 A, 33 B and the cable guide 35 will be described below in detail.

The display 41 displays, for example, vehicle speed, travel distance, remaining power of the battery 11, the remaining distance assisted by the electric motor 9, and the like. The display 41 may include a microprocessor that calculates information to be displayed on the display 41 using information received from sensors mounted on the bicycle 1. Further, the display 41 may include buttons 41b and 41c, for example, that switch information displayed on the display 41. The buttons 41b and 41c are located at a rear region of the upper surface 41d of the display 41 (see FIG. 6).

The display attachment 31 is located farther forward than the handlebar 20. More specifically, the handlebar 20 includes a portion disposed inside the receiver 21b of the handle stem 21. The display attachment 31 is positioned farther forward than the portion inside the receiver 21b. Hereinafter, the portion of the handlebar 20 located inside the receiver 21b is referred to as "handlebar central portion 20b". As a result, the display 41 is located in front of the handlebar central portion 20b. The structure of the support 30 provides the display 41 at an appropriate height. For example, the position of the display 41 is able to be lower than that in the conventional structure in which the display is located on the upper side of the handle stem. This enables the distance between the display 41 and the eyes of a rider to be comfortable for the rider. Also, when the rider looks at the display 41, the display 41 located farther forward than the handlebar 20 decreases the angle of movement of the sight line of the rider, which improves the visibility of the display 41.

Figure 6:
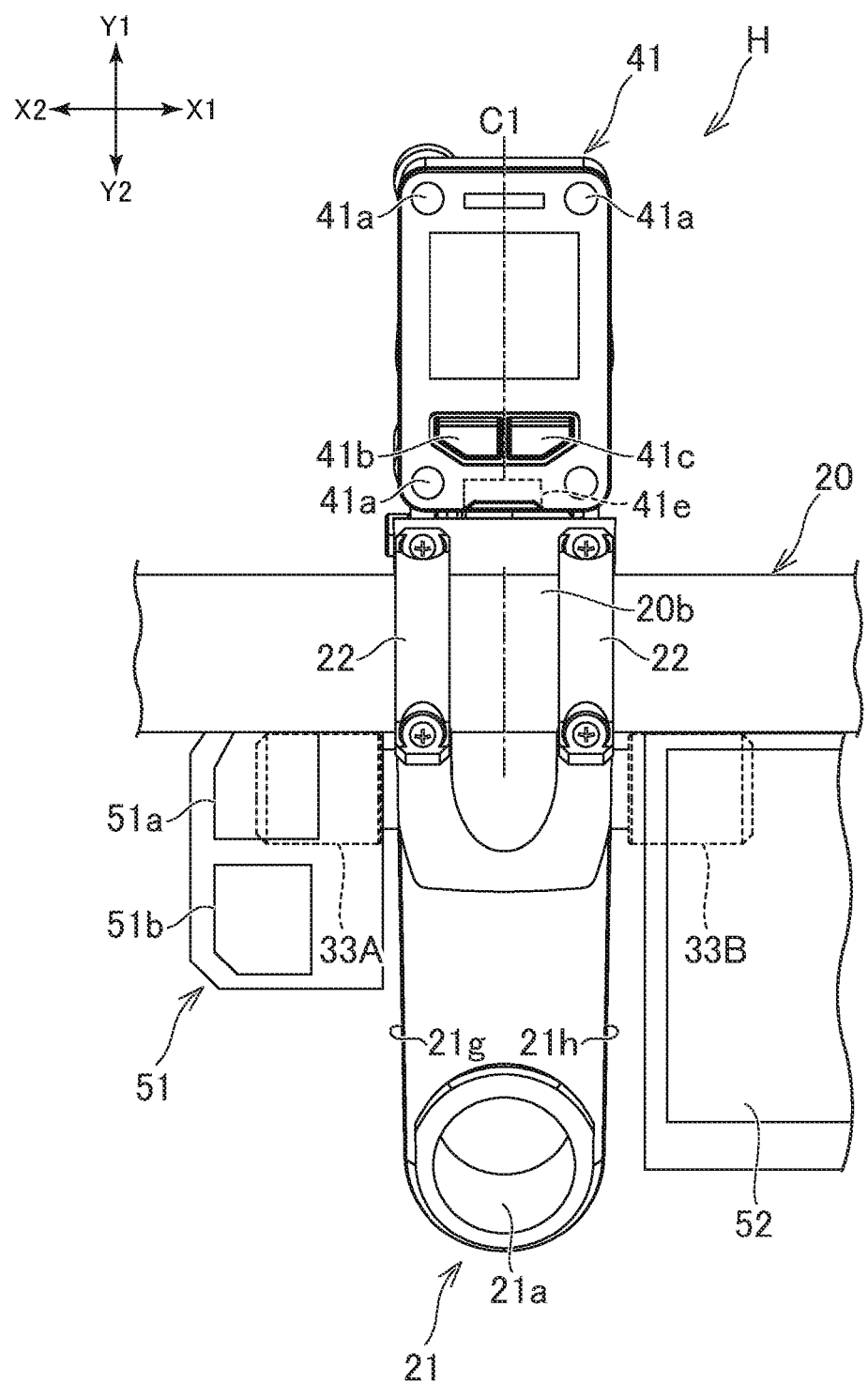
FIG. 6 is a plan view of the stem assembly. In this drawing, a headlight is removed.

As shown in FIGS. 4 and 6, the display 41 is located in the extending direction (the direction D2 in FIG. 4) with respect to the handle stem 21. This arrangement of the display 41 reduces the distance between the buttons 41b, 41c of the display 41 and the handlebar 20. This makes it easier for a rider to operate the buttons 41b, 41c while gripping the handlebar 20.

As shown in FIG. 4, in a preferred embodiment of the bicycle 1, the upper surface 41d of the display 41 is positioned lower than the upper surface 21d of the handle stem 21 in a direction (the direction D1 in FIG. 4) perpendicular or substantially perpendicular to the extending direction of the handle stem 21. Also, the upper surface 41d of the display 41 is positioned higher than a straight line L1 extending in the direction D1 and passing through the upper end of the handlebar 20. This makes it easier for a rider to operate the buttons 41b, 41c while gripping the handlebar 20.

The position of the display 41 is not limited to the preferred embodiment described above. A portion of or the entire display 41 may be positioned higher than the upper surface 21d of the handle stem 21. In another example, a portion of or the entire display 41 may be lower than the straight line L1 passing through the upper end of the handlebar 20. In still another example, the position of the display 41 may be shifted in the right-left direction with respect to the handle stem 21.

Figure 8:
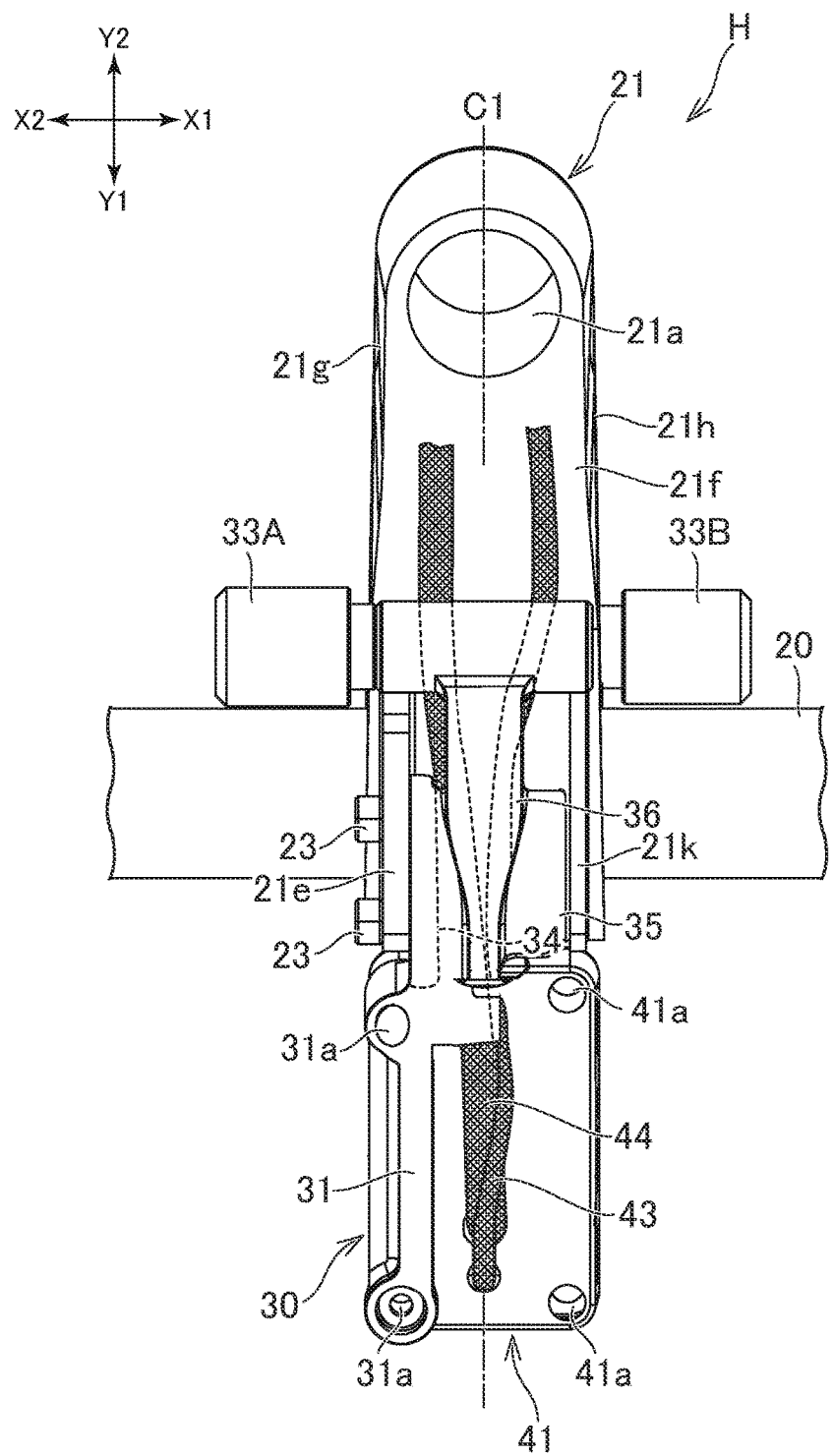
FIG. 8 is a bottom view of the stem assembly.

As shown in FIG. 8, the position of the display attachment 31 is shifted rightward or leftward with respect to the center C1 of the display 41. This arrangement enables other components to be placed in the space under the display 41. For example, cables 43, 44 connected to the display 41 are located under the display 41. The cables 43, 44 are connected to the bottom surface of the display 41.

As shown in FIG. 3, in a preferred embodiment of the bicycle 1, the display 41 includes attachment holes 41a at each of its four corners. The display 41 is attached to the display attachment 31 using some of the four attachment holes 41a. More specifically, the display 41 is attached to the display attachment 31 using only the left two attachment holes 41a. Attachment holes 31a are located at the front end and the rear end of the display attachment 31. The display 41 is attached to the display attachment 31 with, for example, a screw inserted into the attachment holes 41a, 31a. The display attachment 31 includes a rib 31b on its lower side to reinforce the display attachment 31.

The attachment of the display 41 to the display attachment 31 is not limited to the preferred embodiment described above. The display 41 may be removable from the display attachment 31. For example, the support 30 may include an engagement portion to be caught on the display 41. The support 30 may be removable from the display 41 by disengagement of the engagement portion and the display 41. Further, one of the display 41 and the support 30 may include an operation portion operated by the user in order to cancel the engagement between the engagement portion of the support 30 and the display 41.

As shown in FIG. 3, the support 30 is preferably separate from the handle stem 21. The support 30 is integrally made of, for example, metal, and the handle stem 21 is preferably made of a metal separate from the support 30. The support 30 is attached to the handle stem 21 using a fastener such as screws and bolts. This increases the freedom in the shape of the support 30. For example, this enables a portion such as the cable guide 35 described above to be provided in the support 30. Note that, the support 30 may include a plurality of separate but integral portions. In a preferred embodiment of the bicycle 1, the support 30 includes supplementary attachments (second attachments) 33A, 33B. The supplementary attachments 33A and 33B are separate from the display attachment 31 (see FIG. 9). The supplementary attachments 33A, 33B may be integral with other portions of the support 30. Functional portions different from the supplementary attachments 33A, 33B may be separated from the support 30. For example, a connector 34 and a rear extending portion 36 may be integral, and the display attachment 31 and the headlight attachment 32 may be separate from each other. In this case, the display attachment 31 and the headlight attachment 32 may be integral or separate. That is, functional portions of the support 30 may be separate. That is, the support 30 may be divisible into three separate portions, for example. The three portions may be spaced apart from each other, or the three portions may be fastened to each other.

A structure in which the attachments that mount the components or the devices on the bicycle 1 is provided, for example, in the clamp 22, and not in the support 30 may cause an inconvenience that the clamp 22 needs to be removed from the handle stem 21 to repair or adjust the devices, and removing the clamp 22 leads to a change (deviation) in the angular position of the handlebar 20. However, the structure in which the support 30 is attached to the handle stem 21 enables the support 30 to be removed from the handle stem 21 to repair or adjust the devices without a change (deviation) in the angular position of the handlebar 20.

Welding may be used instead of a screw or a bolt to attach the support 30 to the handle stem 21. As still another example, the support 30 may be integral with the handle stem 21. That is, the support 30 and the handle stem 21 may be made in one metal molding.

Figure 5:
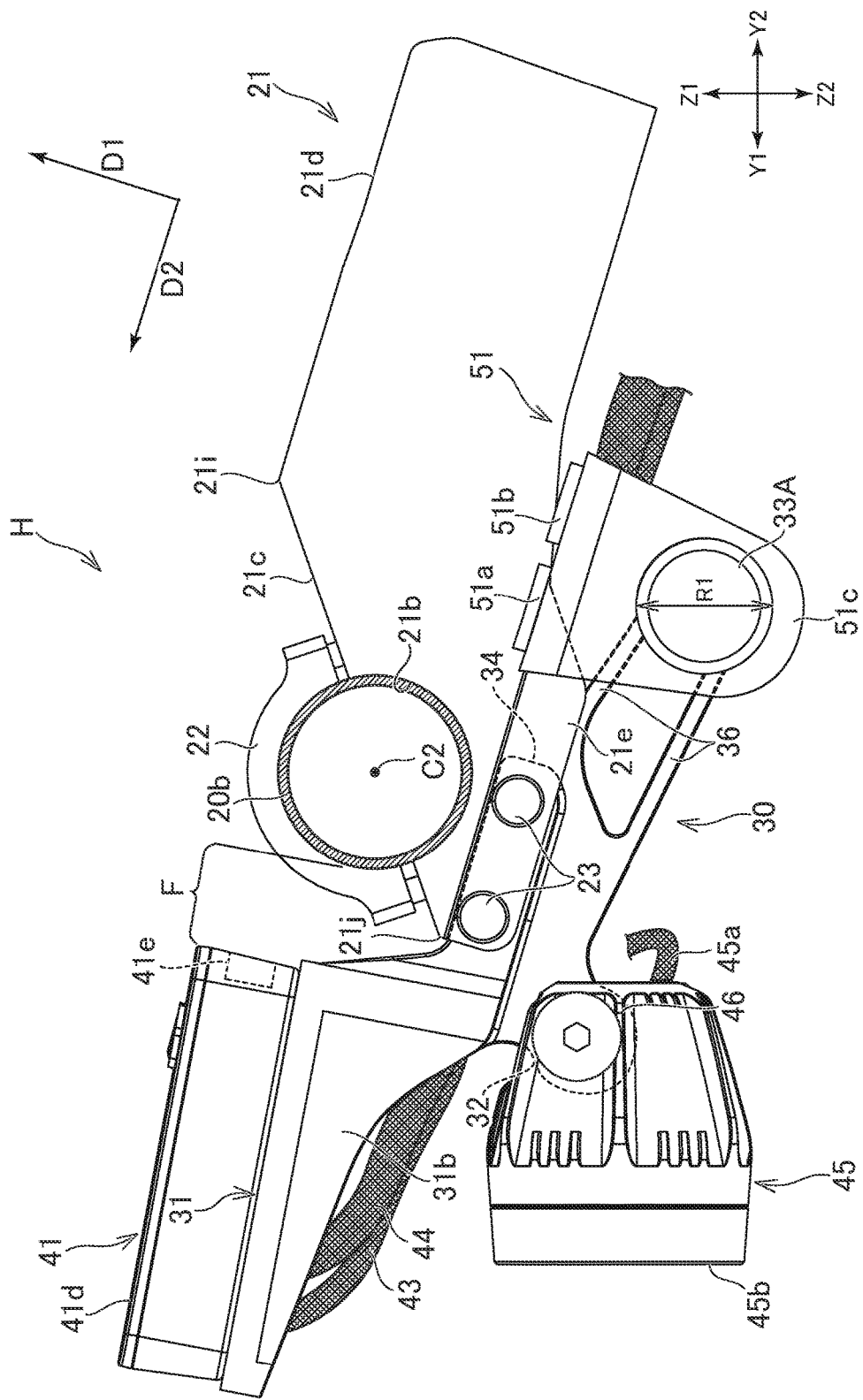
FIG. 5 is a side view of the stem assembly. This drawing shows an input mounted on the stem assembly.

In a preferred embodiment of the bicycle 1, as shown in FIGS. 3 and 5, the support 30 includes, in its base portion, a connector 34 attached to the handle stem 21. The connector 34 is located under the handle stem 21 and is attached to the handle stem 21. This arrangement of the connector 34 allows the connector 34 to be hidden under the handle stem 21 and prevents the connector 34 from interfering with the operation of a rider. In this context, the support 30 (specifically, the display attachment 31) extends forward from the connector 34 beyond the position of the handlebar 20. Further, the display attachment 31 is positioned higher than the connector 34.

Figure 9:
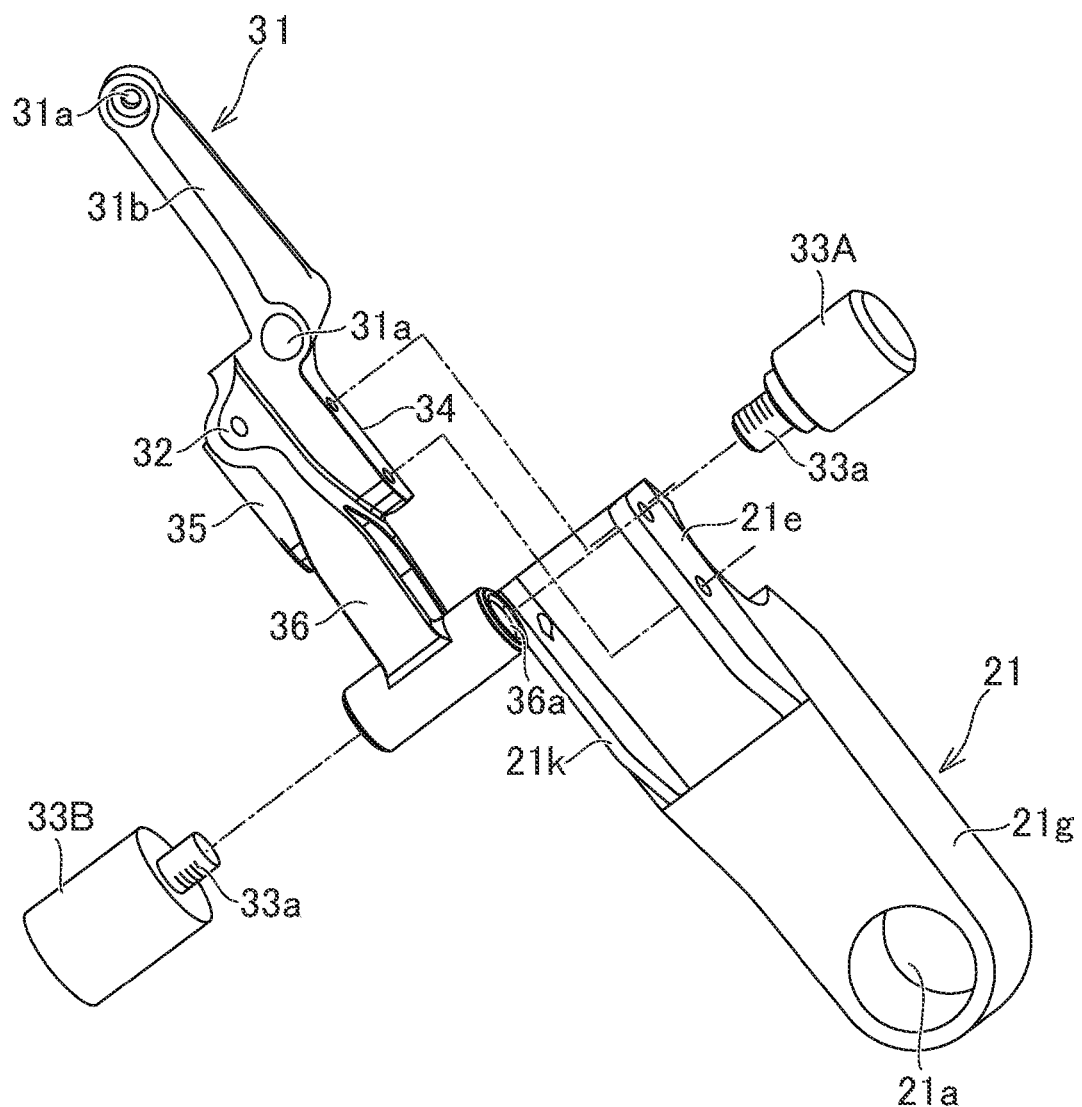
FIG. 9 is an exploded perspective view of the handle stem and the support.
Figure 10:
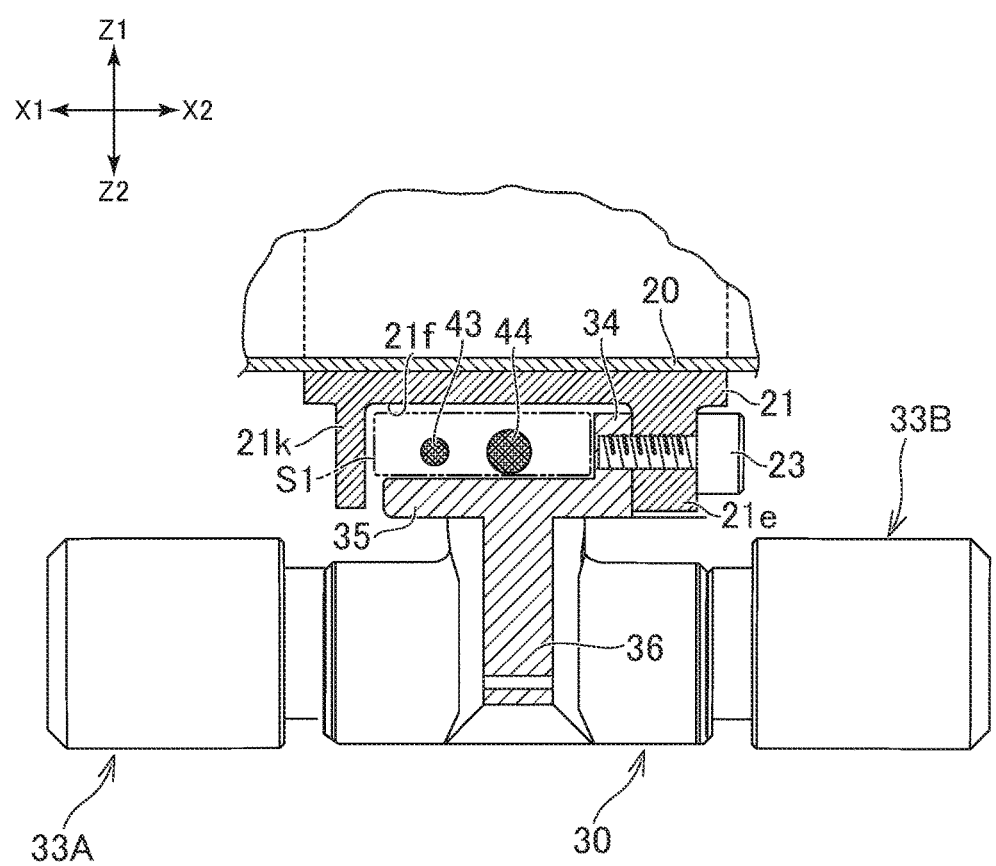
FIG. 10 is a cross-sectional view taken along the line X-X shown in FIG. 5.

As shown in FIG. 9, the handle stem 21 includes, in its bottom portion, a connector 21e to which the connector 34 of the support 30 is attached. The connector 34 and the connector 21e are aligned in the left-right direction (see FIG. 8) and fixed to each other. The connector 34 and the connector 21e are in contact with each other. This fastener allows the position of the display 41 in the left-right direction to be defined by the connector 34 and the connector 21e (more particularly by their side surfaces touching each other). This improves the positional accuracy of the display 41 in the right-left direction.

As shown in FIG. 3, in a preferred embodiment of the bicycle 1, the connector 21e of the handle stem 21 includes a wall protruding downward from the lower surface of the handle stem 21 and extending in the front-rear direction. The connector 34 of the support 30 is arranged along the side surface of the connector 21e. The connector 34 and the connector 21e are fixed to each other by, for example, screws 23 (see FIGS. 3 and 5) inserted into the fixing holes located therein.

The fastener of the connector 34 and the connector 21e is not limited to the preferred embodiment described above. For example, the connector 34 and the connector 21e may overlap each other in the vertical direction. Then, the connector 34 and the connector 21e may be fixed to each other by, for example, screws inserted from the lower side thereto. In still another example, the connector 34 and the connector 21e may extend in the front-rear direction. The connector 34 and the connector 21e may be fixed to each other by, for example, screws inserted from the front side or the rear side thereto.

As shown in FIG. 3, the support 30 includes a headlight attachment 32 to which a headlight 45 is attached. The headlight 45 is a light that shines light in front of the bicycle 1. As shown in FIG. 5, the headlight attachment 32 is located lower than the display attachment 31 in a side view. In addition, the headlight attachment 32 is located farther rearward than the front end of the display attachment 31 in a side view. Thus, the headlight 45 is located under the display 41.

This arrangement of the headlight 45 reduces the length of the stem assembly H in the front-rear direction, for example, as compared with an arrangement in which the headlight 45 is located farther forward than the display 41. In addition, this arrangement of the headlight 45 enables the headlight 45 to illuminate an area near a rider's foot, compared with, for example, an arrangement in which the headlight 45 is located farther forward than the display 41.

In a preferred embodiment of the bicycle 1, the headlight 45 and the display 41 are positioned at the center C1 in the left-right direction of the handlebar 20. The headlight 45 is positioned directly under the display 41. The front end 45b of the headlight 45 is located farther rearward than the front end of the display 41. The headlight 45 and the headlight attachment 32 are fixed to each other by, for example, bolts 46 inserted thereto from the outside in the right-left direction.

The handlebar 20 includes a portion extending rightward from the handlebar central portion 20b and a portion extending leftward from the handlebar central portion 20b. As shown in FIG. 6, the support 30 includes supplementary attachments 33A, 33B. The supplementary attachments 33A, 33B extend rightward or leftward. That is, the supplementary attachments 33A and 33B extend outward to support devices provided on the bicycle 1 and devices owned by a rider. This structure enables a device configured to be attached to the handlebar 20 to be attached to the supplementary attachments 33A, 33B, and not to the handlebar 20. Thus, the number of devices to be arranged around the handlebar 20 is increased. Here, a "device" may be a component (for example, the input 51) of the bicycle 1 or a device which is not a component of the bicycle 1 (for example, a mobile terminal 52 owned by a rider). In a preferred embodiment of the bicycle 1, the support 30 preferably includes two supplementary attachments 33A, 33B. The number of the supplementary attachments 33A, 33B is not limited to two. That is, the support 30 may include only one of the supplementary attachments 33A, 33B, or may include three or more supplementary attachments.

The cross-sectional shapes of the supplementary attachments 33A, 33B are preferably the same as the cross-sectional shape of the handlebar 20. More specifically, their cross-sectional shapes are preferably circular or substantially circular. The supplementary attachments 33A, 33B preferably have a cylindrical shape. The diameter of the supplementary attachments 33A and 33B is preferably the same as that of the handlebar central portion 20b, for example. The diameter of the supplementary attachments 33A and 33B may be different from that of the handlebar 20. In a preferred embodiment of the bicycle 1, as shown in FIGS. 5 and 4, the diameter R1 of the supplementary attachments 33A, 33B is preferably smaller than that of the handlebar central portion 20b.

As shown in FIGS. 4 and 5, the supplementary attachments 33A, 33B are located farther rearward than the connector 34. Accordingly, the support 30 is fixed to the handle stem 21 using the portion (the connector 34) between the display attachment 31 and the supplementary attachments 33A, 33B. This structure enables a load applied to the front portion of the support 30 and a load applied to the rear portion of the support 30 to be balanced.

As shown in FIGS. 4 and 5, the support 30 includes a rear extending portion 36 extending rearward of the connector 34. The supplementary attachments 33A, 33B respectively protrude leftward and rightward from the rear extending portion 36, and are located farther outward in the right-left direction than the side surface of the handle stem 21 in a plan view as shown in FIG. 6. That is, the left supplementary attachment 33A is located farther leftward than the left side surface 21g of the handle stem 21, and the right supplementary attachment 33B is located farther rightward than the right side 21h of the handle stem 21. The arrangement of the supplementary attachments 33A, 33B enables the devices to be smoothly attached to the supplementary attachments 33A, 33B. The supplementary attachments 33A, 33B are located below the handle stem 21 in a side view. As will be described below, the supplementary attachments 33A, 33B in a preferred embodiment of the bicycle 1 are detachable from the rear extending portion 36.

As shown in FIG. 5, the supplementary attachment 33A is located farther rearward than the center line C2 of the handlebar central portion 20b. The center line C2 of the handlebar central portion 20b is a straight line that is parallel to the central portion 20b and passes through the central point of the center portion 20b. Further, the supplementary attachment 33A is located lower than the center line C2 of the handlebar central portion 20b. The input 51 for a rider to operate by his/her finger is attached to the supplementary attachment 33A. This arrangement of the supplementary attachment 33A and the input 51 enables the user to operate the input 51 smoothly while driving the bicycle 1. For example, the rider is able to operate the input 51 with his/her finger, for example with his/her hand placed on the handlebar 20.

In a preferred embodiment of the bicycle 1, the supplementary attachment 33A is located lower and farther rearward than the entire handlebar central portion 20b. In other words, the supplementary attachment 33A is located lower and farther rearward than the receiver 21b in the handle stem 21. The handlebar 20 is located on the inclined surface (that is, the front surface 21c) of the handle stem 21. The supplementary attachment 33A is located under the inclined surface in a side view. Also, the supplementary attachment 33A is located behind the headlight 32 in a side view.

The input 51 may be a switch that inputs an instruction to switch a control mode to a controller (not shown) that controls the electric motor 9. A rider is able to switch the assist force among, for example, three levels (strong assist mode, medium assist mode, weak assist mode) by operating the input 51. The function of the input 51 is not limited to this. As shown in FIGS. 5 and 6, the input 51 may include an annular portion 51c in its lower portion. The annular portion 51c is attached to the supplementary attachment 33A.

The input 51 may include buttons 51a, 51b on its upper surface. As shown in FIG. 5, the buttons 51a, 51b are located farther rearward than the center line C2 of the handlebar central portion 20b. In addition, the buttons 51a, 51b are located lower than the center line C2 of the handlebar central portion 20b. This arrangement of the buttons 51a, 51b enables a rider to operate the input device 51 smoothly while driving the bicycle 1. For example, the rider is able to operate the buttons 51a, 51b of the input device 51 with his/her thumb with the hand placed on the handlebar 20. In a preferred embodiment of the bicycle 1, the buttons 51a, 51b are located farther rearward than the entire handlebar central portion 20b and are located lower than the entire handlebar central portion 20b. Also, as shown in FIG. 6, the front end of the input 51 overlaps the handlebar 20 in a plan view.

The arrangement of the input 51 is not limited to the preferred embodiment of the bicycle 1 described above. For example, the buttons 51a, 51b may be located higher than the center line C2 of the handlebar central portion 20b. Further, the input 51 may not include the annular portion 51c. In this case, the input 51 may be attached to the supplementary attachment 33A via a connector including the annulus 51c provided separately from the input 51.

As shown in FIG. 6, the supplementary attachment 33B protrudes from the support 30 in the opposite direction to the supplementary attachment 33A. More specifically, the supplementary attachment 33B protrudes in the rightward direction from the rear extending portion 36. The center line of the supplementary attachment 33A and the center line of the supplementary attachment 33B are located on the same straight line. Accordingly, like the supplementary attachment 33A, the supplementary attachment 33B is located lower and farther rearward than the handlebar central portion 20b.

As shown in FIGS. 4 and 6, for example, a mobile terminal 52 may be attached to the supplementary attachment 33B. More specifically, the mobile terminal 52 may be attached to the supplementary attachment 33B via the connector 53. In the example shown in FIG. 4, the connector 53 includes an annular portion 53a in the base portion thereof. The supplementary attachment 33B is fitted into the annular portion 53a. The use of the supplementary attachment 33B enables a rider to manipulate the mobile terminal 52 with a finger while placing the hand placed on the handlebar 20.

As shown in FIG. 9, the support 30 may be structured so that the left and right supplementary attachments 33A, 33B are attachable and detachable with respect to the rear extending portion 36. This structure of the support 30 allows the supplementary attachments 33A, 33B to be exchanged in accordance with a size, a function, and a position of a device to be attached to the supplementary attachments 33A, 33B. That is, the shape, the length, and the thickness of the supplementary attachments 33A, 33B are adjustable. In a preferred embodiment of the bicycle 1, a screw hole 36a is provided at the rear portion of the rear extending portion 36. A screw portion 33a of the supplementary attachments 33A, 33B is fitted into the screw hole 36a.

The positions and shapes of the supplementary attachments 33A, 33B are not limited to the preferred embodiments of the bicycle 1 described above. For example, the position of the supplementary attachment 33A and the position of the supplementary attachment 33B may be deviated from each other in the front-rear direction and/or in the vertical direction. In another example, the supplementary attachments 33A, 33B may be located farther forward than the handlebar central portion 20b. In still another example, one of the length and the thickness of the supplementary attachment 33A may be different from those of the supplementary attachment 33B.

Figure 7:
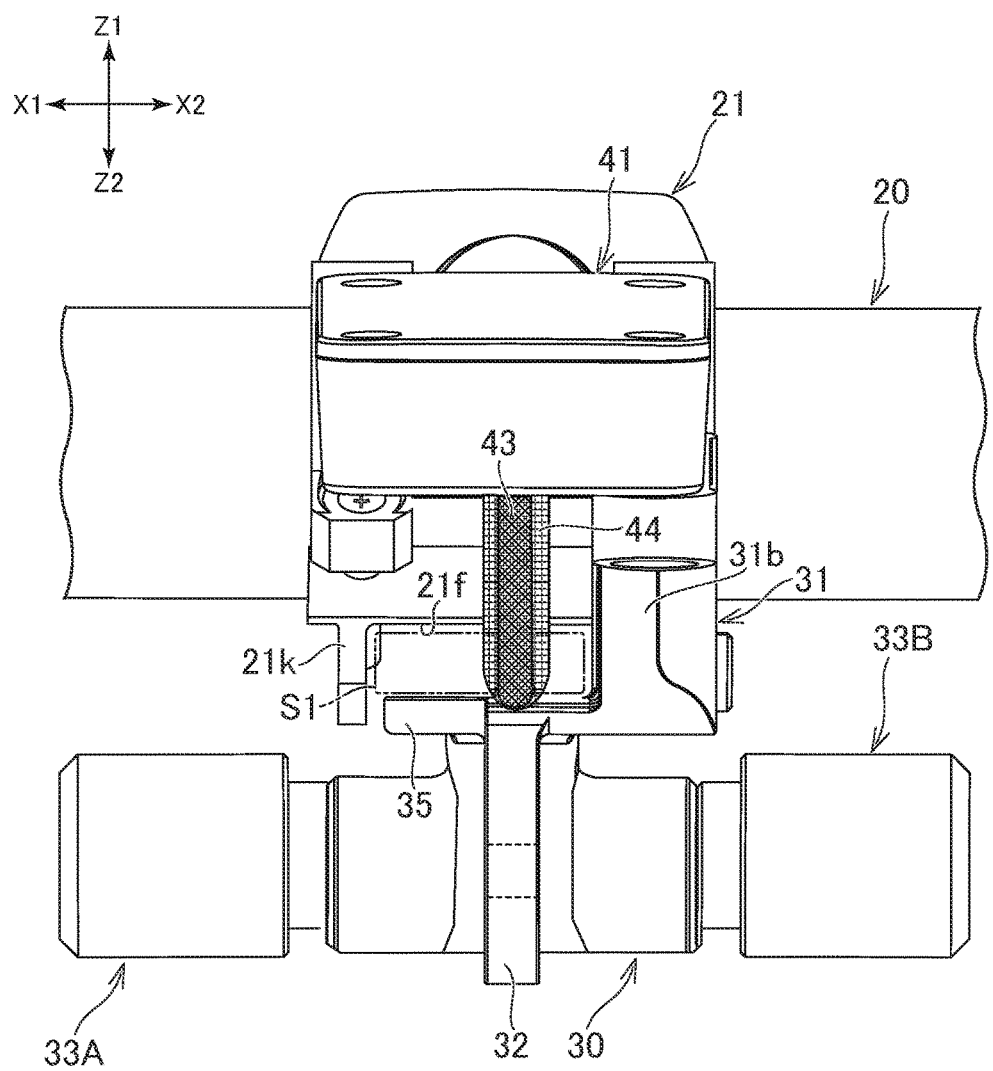
FIG. 7 is a front view of a stem assembly. Also, in this drawing, the headlight is removed.

As shown in FIG. 3, cables 43, 44 are connected to the display 41. The cables 43, 44 connect the display 41 to, for example, the input 51 and the controller (not shown) of the electric motor 9. As shown in FIG. 7, the support 30 includes a cable guide 35. The cable guide 35 defines a cable path S1 through which the cables 43, 44 are passed. This structure enables the layout of the cable disposed around the handlebar 20 to be simplified. In a preferred embodiment of the bicycle 1, the cables 43, 44 enter the cable path S1 from the front side thereof and extend to the rear of the cable path S1. As shown in FIG. 3, a cable 45a is connected to the headlight 45. The cable 45a is also passed through the cable path S1.

Unlike the preferred embodiment of the bicycle 1 described above, only some of the cables 43, 44, 45a may be passed through the inside of the cable path S1. In another example, cables connected, for example, to the brake lever 20a and to the gear shift lever may pass through the cable path S1, instead of the cables 43, 44, 45a or together with the cables 43, 44, 45a.

As shown in FIG. 7, the cable path S1 is defined along the outer surface of the handle stem 21. More specifically, the cable path S1 is defined along the lower surface 21f of the handle stem 21. That is, the cable path S1 is located under the handle stem 21. This structure enables the handle stem 21 to cover the cables 43, 44, 45a and to prevent the cables from being prominently exposed. Here, the phrase "the cable path S1 is located under the handle stem 21" means that at least a portion of the cable passed through the cable path S1 is hidden under the handle stem 21 when the handle stem 21 is viewed in a plan view. Therefore, a portion of the wall defining the cable path S1 (for example, a portion of a cable guide 21k described below) may not overlap with the handle stem 21 in a plan view.

As described above, the support 30 is separate from the handle stem 21, and is attached to the handle stem 21. The cable path S1 is defined by the cable guide 35 and the lower surface 21f of the handle stem 21. Using two separate members to define the cable path S1 facilitates providing walls surrounding the cables 43, 44, 45a.

As shown in FIG. 7, in a preferred embodiment of the bicycle 1, the cable path S1 in a front view preferably has a rectangular or substantially rectangular shape. The cable guide 35 defines a bottom wall of the cable path S1. The connector 34 of the support 30 and the connector 21e of the handle stem 21 define a side wall of the cable path S1. In addition, the handle stem 21 includes a cable guide 21k that defines a wall located on the opposite side from the connectors 34, 21e. The handle stem 21 defines the upper wall of the cable path S1.

The structure of the cable path S1 is not limited to the preferred embodiment of the bicycle 1 described above. For example, the cable path S1 may be defined along the side surface 21g (21h) of the handle stem 21. In this case, the cable guide 35 of the support 30 may define the cable path S1 along the side surface 21g (21h) of the handle stem 21. The wall located on the opposite side from the connectors 34, 21e (in the example, the cable guide 21k) may be provided in the support 30.

A cable extends from the display 41 to the rear of the vehicle body, that is, the cable 44 in the cable path S1 extends along the frame 10. The cable may be disposed inside the frame 10.

As described above, the handle stem 21 includes a front surface 21c which is inclined with respect to the extending direction of the handle stem 21. As shown in FIG. 5, the front surface 21c extends obliquely in a rearward and upward direction. This structure of the handle stem 21 enables the clearance F in the front-rear direction between the handlebar central portion 20b and the display 41 to be reduced, and accordingly decreases the length of the stem assembly H in the front-rear direction. For example, in a structure in which the front surface 21c extends vertically and the receiver 21b for the handlebar 20 is provided on the vertical surface, the display 41 obstructs the operation of fastening a screw to the handle stem 21 to fix the clamp 22 to the handle stem 21. That deteriorates workability in fixing the clamp 22. In other words, in that structure, it is necessary to ensure a sufficient clearance between the display 41 and the front surface 21c of the handle stem 21 so that the fastening operation for the screw is able to be performed. The inclination of the front surface 21c of the handle stem 21 reduces the clearance F and allows smooth fastening of the screw to the handle stem 21. Reducing the clearance F in this way enables a rider to smoothly operate the buttons 41b, 41c of the display 41 while placing his/her hand on the handlebar 20. In addition, when the front surface 21c of the handle stem 21 extends vertically and the receiver 21b for the handlebar 20 is provided on the vertical surface, not only the handle stem 21 but also the clamp 22 receives a large load from the handlebar 20. On the other hand, in the preferred embodiment of the bicycle 1 described above, most of the load applied to the handlebar 20 is received by the handle stem 21.

As shown in FIG. 5, in a preferred embodiment of the bicycle 1, the front surface 21c of the handle stem 21 is inclined over its entire area. The entire handlebar central portion 20b is located lower than the upper end 21i of the front surface 21c and farther forward than the upper end 21i of the front surface 21c. Further, the entire handlebar central portion 20b is positioned higher than the lower end 21j of the front surface 21c and is located farther rearward than the lower end 21j of the front surface 21c. The rear end of the display 41 is located farther forward than the lower end 21j of the front surface 21c of the handle stem 21.

The shape of the handle stem 21 is not limited to the preferred embodiment of the bicycle 1 described above. For example, only a portion of the front surface 21c may be inclined. The receiver 21b of the handlebar 20 may be provided in the inclined portion. In another example, the rear end of the display 41 may be located farther rearward than the lower end 21j of the front surface 21c of the handle stem 21.

As shown in FIG. 6, the display 41 includes a connector 41e. The display 41 is able to be connected to the mobile terminal 52 through the cable connected to the connector 41e. The bicycle 1 includes a battery 11 (see FIG. 1) that drives the electric motor 9. The power of the battery 11 may be supplied to the mobile terminal 52 via the display 41. This enables the mobile terminal 52 to be charged by the electric power of the battery 11.

As shown in FIGS. 5 and 6, the connector 41e is disposed on the rear surface of the display 41, and a cable (not shown) connected to the connector 41e extends rearward from the display 41. As described above, the inclination of the front surface 21c enables a clearance F to be secured between the rear surface of the display 41 and the handlebar central portion 20b. Utilizing the clearance F, a cable is connected to the connector 41e. This cable may also be passed through the cable path S1.

As shown in FIG. 3, the bicycle 1 includes an upper cover 61 covering the upper surface of the display 41. The upper cover 61 includes an opening 61a that exposes the display area of the display 41 and an opening 61b that exposes the buttons 41b, 41c. For example, the upper cover 61 is preferably flush with the upper surface 21d of the handle stem 21 (see FIG. 2). Furthermore, the bicycle 1 includes a lower cover 62 covering the lower surface of the display 41. The lower cover 62 includes an opening through which the cables 43, 44 pass. In the example, the lower cover 62 is preferably flush with the lower surface 21f of the handle stem 21 (see FIG. 2).

The covers 61, 62 may be attached to the stem assembly H by various methods. For example, the support 30 may include a portion that attaches the covers 61, 62. This structure enables an attachment process as follows. The display 41, the headlight 45, and the like are attached to the support 30. Furthermore, the covers 61, 62 are attached to the support 30. Then, these elements are attached to the handle stem 21. The attachment structure of the covers 61, 62 is not limited to the above. For example, the covers 61, 62 may be attached to the handle stem 21 or to the clamp 22.

According to a preferred embodiment of the present invention, the bicycle 1 preferably includes a handlebar 20; a handle stem 21 on which the handlebar 20 is disposed; a clamp 22 that is attached to the handle stem 21 to fix the handlebar 20 on the handle stem 21; and a support 30 extending forward and including a first attachment 31. The first attachment 31 is located farther forward than the handlebar 20 (more specifically, the handlebar central portion 20b). A display 41 is attached to the first attachment 31.

The structure of the support 30 enables the display 41 to be placed at an appropriate height. For example, the structure of the support 30 enables the display 41 to be placed at a lower position, compared with the conventional structure in which the display 41 is located on the upper side of the handle stem. As a result, the distance between the display 41 and eyes of a rider is set as a distance comfortable for the rider. Also, when the rider looks at the display 41, the display 41 located farther forward than the handlebar 20 decreases the angle of movement of the sight line of the rider, which improves the visibility of the display 41.

According to a preferred embodiment of the present invention, the support 30 preferably includes a portion to mount on the bicycle 1 a component or a device that is different from the display 41. This simplifies the layout of the components and the devices arranged around the handlebar 20.

According to a preferred embodiment of the present invention, the component or the device different from the display 41 may be a headlight 45, for example. The support 30 includes, as the portion to mount the component or the device, a headlight attachment 32 to which the headlight 45 is attached.

According to a preferred embodiment of the present invention, the component or the device different from the display 41 may be an input 51 to be operated by a rider, for example. The support 30 includes, as the portion to mount the component or the device, a supplementary attachment 33A (a second attachment) to which the input 51 is attached.

According to a preferred embodiment of the present invention, the support 30 preferably includes a guide 35 that defines a cable path S1 through which cables 43, 44, 45a pass. This simplifies the layout of the cables arranged around the handlebar 20.

According to a preferred embodiment of the present invention, the support 30 is preferably separate from the handle stem 21 and is attached to the handle stem 21. The cable path S1 is defined by the cable guide 35 and the handle stem 21. It is easier to provide walls that define the cable path S1 (walls surrounding the cables 43, 44,45a) by using the two members (that is, the handle stem 21 and the support 30) described above than by using only a single member.

According to a preferred embodiment of the present invention, the cable path S1 is preferably located under the handle stem 21. This enables the handle stem 21 to cover the cables 43, 44, 45a and to prevent the cables 43, 44, 45a from being prominently exposed.

According to a preferred embodiment of the present invention, the support 30 preferably includes supplementary attachments 33A, 33B (second attachments) to which a component or a device different from the display 41 is attached. The supplementary attachments 33A, 33B may extend in the right-left direction. This structure enables a device that has been configured to be attached to the handlebar 20 to be attached to the supplementary attachments 33A, 33B and not to the handlebar 20. As a result, the number of components and devices arranged around the handlebar 20 is increased.

According to a preferred embodiment of the present invention, the support 30 preferably includes a right supplementary attachment 33B located rightward of the handle stem 21 in a plan view and a left supplementary attachment 33A located leftward of the handle stem 21 in a plan view.

According to a preferred embodiment of the present invention, the supplementary attachment 33A is preferably located farther rearward than the center line C2 of the handlebar 20. This enables a rider to operate the input 51 attached to the supplementary attachment 33A with, for example, his/her thumb.

According to a preferred embodiment of the present invention, the supplementary attachment 33A is preferably located lower than the center line C2 of the handlebar 20 in a side view. This enables a rider to operate the input 51 attached to the supplementary attachment 33A with his/her thumb.

According to a preferred embodiment of the present invention, the support 30 is preferably separate from the handle stem 21 and is attached to the handle stem 21. This increases the freedom in the shape of the support 30.

According to a preferred embodiment of the present invention, the support 30 preferably includes a connector 34 disposed under the handle stem 21 and attached to the handle stem 21. This structure prevents the support 30 from being prominently exposed.

According to a preferred embodiment of the present invention, the handle stem 21 preferably includes a front surface 21c including an inclined surface. The inclined surface extends obliquely in a rearward and upward direction and includes a receiver 21b in which the handlebar 20 is inserted. The display 41 is located in front of the inclined surface. This reduces the clearance F between the handlebar 20 and the display 41 in the front-rear direction.

According to a preferred embodiment of the present invention, the display preferably includes a connector 41e in a rear surface thereof. This enables a cable to be connected to the connector 41e, thus utilizing the clearance F.

According to a preferred embodiment of the present invention, a stem assembly H preferably includes a handle stem 21 in which a handlebar 20 is disposed, a clamp 22 that is attached to the handle stem 21 and fixes the handlebar 20 to the handle stem 21, and a support 30 attached to the handle stem 21. The support 30 includes supplementary attachments 33A, 33B extending in the right-left direction and located farther rearward than the center line C2 of the handlebar 20 (more specifically, the center line C2 of the handlebar central portion 20b) in a plan view. This increases the number of components and devices arranged around the handlebar 20. Further, this enables a rider to smoothly operate the input 51 attached to the supplementary attachments 33A, 33B. The supplementary attachment 33A, 33B may be located lower than the center line C2 of the handlebar 20 (more specifically, the center line C2 of the handlebar central portion 20b) in a side view. This enables a rider to further smoothly operate the input 51 attached to the supplementary attachments 33A, 33B.

Although the present invention has been illustrated and described herein with reference to preferred embodiments and specific examples thereof, it will be readily apparent to those of ordinary skill in the art that other preferred embodiments and examples may perform similar functions and/or achieve like results. All such equivalent preferred embodiments and examples are within the spirit and scope of the present invention, are contemplated thereby, and are intended to be covered by the following claims.

For example, the support 30 may not include one or more of the display attachment 31, the headlight attachment 32, and the supplementary attachments.

Further, the bicycle 1 may not include the covers 61, 62 that cover the display 41.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bicycle comprising:
a handlebar;
a handle stem on which the handlebar is disposed;
a clamp that is attached to the handle stem to fix the handlebar on the handle stem;
a support attached to, and extending forward from, the handle stem and including a first attachment located farther forward than the handlebar; and
a display attached to the first attachment.

2. The bicycle according to claim 1, wherein the support includes a portion to mount a component or a device that is different from the display.

3. The bicycle according to claim 2, wherein the support includes at least one second attachment to which the component or the device different from the display is attached, and the at least one second attachment extends in a right-left direction.

4. The bicycle according to claim 3, wherein the at least one second attachment includes a right second attachment located rightward of the handle stem in a plan view and a left second attachment located leftward of the handle stem in the plan view.

5. The bicycle according to claim 2, wherein the component or the device different from the display includes an input that a rider operates; and
the portion to mount the component or the device includes a second attachment having the input attached thereto.

6. The bicycle according to claim 1, wherein the support includes a guide that defines a cable path through which a cable extends.

7. The bicycle according to claim 6, wherein the support is separate from the handle stem and is attached to the handle stem; and
the guide defines the cable path together with the handle stem.

8. The bicycle according to claim 6, wherein the cable path is located under the handle stem.

9. The bicycle according to claim 1, wherein the support is separate from the handle stem and is attached to the handle stem.

10. The bicycle according to claim 9, wherein the support includes a connector disposed under the handle stem and attached to the handle stem.

11. The bicycle according to claim 1, wherein the handle stem includes a front surface including an inclined surface, the inclined surface extending obliquely in a rearward and upward direction and including a receiver on which the handlebar is disposed; and
the display is located in front of the receiver.

12. The bicycle according to claim 11, wherein the display includes a connector in a rear surface thereof.

13. A bicycle comprising:
a handlebar;
a handle stem on which the handlebar is disposed;
a clamp that is attached to the handle stem to fix the handlebar on the handle stem;
a support extending forward from the handle stem and including a first attachment located farther forward than the handlebar; and
a display attached to the first attachment; wherein
the support includes a portion to mount a headlight, and the portion includes a second attachment having the headlight attached thereto.

14. A bicycle comprising:
a handlebar;
a handle stem on which the handlebar is disposed;
a clamp that is attached to the handle stem to fix the handlebar on the handle stem;
a support extending forward from the handle stem and including a first attachment located farther forward than the handlebar; and
a display attached to the first attachment; wherein
the support includes at least one second attachment to which a component or a device that is different from the display is attached, and the at least one second attachment extends in a right-left direction; and
the at least one second attachment is located farther rearward than a center line of the handlebar.

15. The bicycle according to claim 14, wherein the at least one second attachment is located lower than a center line of the handlebar in a side view.

16. A stem assembly comprising:
a handle stem on which a handlebar is disposed;
a clamp that is attached to the handle stem to fix the handlebar to the handle stem;
a support attached to, and extending forward from, the handle stem; wherein
the support includes an attachment for a display to be attached thereto, and the attachment is located farther forward than the handlebar.

* * * * *